United States Patent [19]
Iwatsuki et al.

[11] Patent Number: 5,272,631
[45] Date of Patent: Dec. 21, 1993

[54] SHIFT CONTROL SYSTEM AND METHOD FOR VEHICULAR AUTOMATIC TRANSMISSIONS

[75] Inventors: Kunihiro Iwatsuki; Hideaki Otsubo, both of Toyota, Japan

[73] Assignee: Toyota Jidosha Kabushiki Kaisha, Toyota, Japan

[21] Appl. No.: 989,922

[22] Filed: Dec. 11, 1992

Related U.S. Application Data

[63] Continuation of Ser. No. 622,637, Dec. 5, 1990, abandoned.

[30] Foreign Application Priority Data

Dec. 6, 1989 [JP] Japan .................................. 1-317006
Dec. 15, 1989 [JP] Japan .................................. 1-325687

[51] Int. Cl.⁵ ............................................. B60K 41/08
[52] U.S. Cl. .................................... 364/424.1; 74/866
[58] Field of Search .............. 364/424.1; 74/866, 865, 74/867, 868, 869

[56] References Cited

U.S. PATENT DOCUMENTS

| | | | |
|---|---|---|---|
| 4,669,335 | 6/1987 | Matsuoka et al. | 74/866 |
| 4,690,017 | 9/1987 | Taniguchi et al. | 74/866 |
| 4,771,386 | 9/1988 | Yasue et al. | 364/424.1 |
| 4,945,482 | 7/1990 | Nishikawa et al. | 364/424.1 |
| 4,955,256 | 9/1990 | Kashihara et al. | 74/866 |
| 4,966,049 | 10/1990 | Takahashi | 74/866 |

Primary Examiner—Thomas G. Black
Assistant Examiner—Collin W. Park
Attorney, Agent, or Firm—Oblon, Spivak, McClelland, Maier & Neustadt

[57] ABSTRACT

A shift control system for controlling the shifts of a vehicular automatic transmission connected to an engine includes first and second transmission assemblies capable of executing the shifts independently of each other and connected in tandem to each other. The shift control system includes: shift deciding means for deciding that the shifts are to be executed, on the basis of input data; a shift pattern setting element for setting a shift pattern determining a shift point and a gear stage so that the decided shift may be other than the simultaneous one in which the first and second transmission assemblies are simultaneously shifted; and a gear stage determining element for outputting a shift signal so that the shifts may be executed according to the set shift pattern.

13 Claims, 12 Drawing Sheets

FIG. 3

| Shift Range | Speed Stage | 2nd Transmission Assembly | | 1st Transmission Assembly | | | | | 2nd T.A. | 1st T.A. | Gear Ratio |
|---|---|---|---|---|---|---|---|---|---|---|---|
| | | Bo | Co | C1 | C2 | B1 | B2 | B3 | | | |
| P, N | — | | | | | | | | | | |
| R | — | | ○ | | ○ | | | ○ | LOW | RW | |
| D | 1 | | ○ | ○ | | | | | LOW | 1ST | 2.804 |
| D | 2 | ○ | | ○ | | | | | HIGH | 1ST | 1.977 |
| D | 3 | | ○ | ○ | | | ○ | | LOW | 2ND | 1.532 |
| D | (4) | ○ | | ○ | | | ○ | | HIGH | 2ND | 1.080 |
| D | 5 | | ○ | ○ | ○ | | ○ | | LOW | 3RD | 1.000 |
| D | 6 | ○ | | ○ | ○ | | ○ | | HIGH | 3RD | 0.705 |
| 3 | 1 | | ○ | ○ | | | | | LOW | 1ST | 2.804 |
| 3 | 2 | ○ | | ○ | | | | | HIGH | 1ST | 1.977 |
| 3 | 3 | | ○ | ○ | | ○ | ○ | | LOW | 2ND | 1.532 |
| 3 | 4 | ○ | | ○ | | ○ | ○ | | HIGH | 2ND | 1.080 |
| 2 | 1 | | ○ | ○ | | | | | LOW | 1ST | 2.804 |
| 2 | 2 | ○ | | ○ | | | | ○ | HIGH | 1ST | 1.977 |
| L | 1 | | | ○ | | | | ○ | LOW | 1ST | 2.804 |

SHIFT CONTROL SYSTEM AND METHOD FOR VEHICULAR AUTOMATIC TRANSMISSIONS

This application is a continuation of application Ser. No. 07/622,637, filed on Dec. 5, 1990, now abandoned.

BACKGROUND OF THE INVENTION

The present invention relates to system and method for controlling the shifts of an automatic transmission for vehicles and, more particularly, to a technology for controlling the shifts of an automatic transmission which has first and second transmission assemblies connected in tandem for executing the shifting operations independently of each other.

Generally speaking, an automatic transmission is equipped with a gear transmission assembly and a plurality of frictional engagement means so that the combinations of the engagement states of the plural frictional engagement means can be switched to achieve any of a plurality of gear stages by actuating hydraulic control means.

In the prior art, the number of gear stages to be achieved by the automatic transmission is ordinarily three or four. In recent years, however, there has been denoted a multistage automatic transmission which can achieve five or six or more gear stages so as to improve the power performance and the fuel consumption better. If, for example, a first transmission assembly capable of switching three stages of 1st to 3rd speeds and a second transmission assembly capable of switching high and low two stages are connected in tandem, there is provided an automatic transmission which can achieve forward six gear stages, as disclosed in Japanese Patent Laid-Open No. 64-15560.

If, however, this example is enabled to achieve all of those six gear stages according to a predetermined shift pattern of one kind, the shifts are seriously frequently executed to cause a problem that the driver cannot be kept away from a busy shift feel.

In case of a shift from the 2nd to 3rd speeds, for example, the automatic transmission disclosed in the above-specified Laid-Open has its first transmission assembly shifted to a high gear and its second transmission assembly shifted reversely to a low gear so that the automatic transmission is shifted up in its entirety. As a result, the two transmission assemblies have to be simultaneously shifted while being precisely synchronized, to cause another problem that the shift control is seriously difficult.

In case, moreover, the accelerator pedal is abruptly released, the disclosed automatic transmission is caused to establish a jumping shift from 2nd to 5th speeds. In this case, the first transmission assembly has to execute an upshift from the 1st to 3rd speeds whereas the second transmission assembly has to execute a downshift. Then, three frictional engagement means have to be simultaneously applied, thus causing a further problem that the smooth shift becomes more difficult to execute.

In order to solve the aforementioned various problems, the invention disclosed in Japanese Patent Laid-Open No. 61-244957 is inhibited to execute the shifts as a whole of the automatic transmission by shifting the first and second transmission assemblies simultaneously.

If, however, all the shifts, in which the first and second transmission assemblies are to be simultaneously shifted, are merely inhibited, the merit of the multiple stages can be hardly exploited to make it impossible to avoid the problem of a deterioration in the running performance such as a reduction in the driving force.

In order to establish a high drive torque in a high speed range or improve the effect of the engine braking, the automatic transmission has its shift ranges determined by inhibiting an upshift to a predetermined or higher gear stage. The ranges conceivable to be held are the L-range, the 2nd range and 3rd range, which are manually switched.

In case of a shift from a range of holding a lower gear stage to a range of allowing a higher gear stage, the upshift is caused by switching the ranges if the running state requires a higher gear stage. For example, in case the 2nd range is selected in the automatic transmission of the prior art and is switched from the 3rd range holding the 2nd speed to the D range allowing the highest gear stage, the possibility of causing the upshift from 2nd to 3rd speeds is remarkably high. Moreover, this upshift from the 2nd to 3rd speeds is achieved by shifting the first and second transmission assemblies in the opposite directions, and the region (to be determined by the vehicle speed and the engine load) for causing the upshift is drastically widened. Despite this fact, however, the varying ranges of the engine torque and the speed of rotary components are different depending upon the variations and the varying rate of the throttle opening so that the engagement pressures of the frictional engagement means for setting the gear stages are accordingly different. This makes it seriously difficult to achieve the shift from the 2nd to 3rd speeds with low shift shocks all over the aforementioned wide ranges.

SUMMARY OF THE INVENTION

An object of the present invention is to provide shift control system and method for executing shifts with small shocks by easy controls.

Another object of the present invention is to avoid the simultaneous shifts of the first and second transmission assemblies.

Still another object of the present invention is to avoid the simultaneous shifts by setting each gear stage with a shift pattern for determining the shift point and the gear stage.

According to the present invention, there is provided a shift control system which comprises: means for detecting a currently set gear stage; shift deciding means for deciding that the shifts are to be executed, on the basis of input data; shift pattern setting means for setting a shift pattern determining a shift point and a gear stage so that the decided shift may be other than the simultaneous one in which the first and second transmission assemblies are simultaneously shifted; and gear stage determining means for outputting a shift signal so that the shifts may be executed according to the set shift pattern.

In the shift control system of the present invention, the shift pattern setting means is constructed to preset a shift pattern intrinsic or unique to at least one of the gear stages.

The shift control system of the present invention further comprises detection means for detecting that a shift from the gear stage in operation to another has been completed, and the gear stage determining means is constructed to output a shift signal for effecting the shift in accordance with the intrinsic shift pattern set for the gear stage in operation, till the detection means detects the completion of the shift.

The shift control system further comprises shift range selecting means for changing a shift range by a manual operation and inputting the shift range as one of the input data to the shift deciding means.

In the shift control system of the present invention, the shift pattern setting means is constructed to set the shift pattern determining the shift point and the gear stage in a manner to avoid the simultaneous shift when a power is inputted from the engine to the automatic transmission.

According to the present invention, there is also provided a shift control method of controlling the shifts of a vehicular automatic transmission connected to an engine and comprising first and second transmission assemblies capable of executing the shifts independently of each other and connected in tandem to each other, wherein a shift pattern determining a shift point and a gear stage from a detected currently set gear stage is set so that the shift decided on the basis of input data may be other than the simultaneous one in which the first and second transmission assemblies are simultaneously shifted, and wherein the shifts are executed according to the set shift pattern.

The above and further objects and novel features of the present invention will more fully appear from the following detailed description when the same is read in connection with the accompanying drawings. It is to be expressly understood, however, that the drawings are for the purpose of illustrations only and is not intended as a definition of the limits of the invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a clutch and brake application chart for setting the individual gear stages;

DETAILED DESCRIPTION OF THE PREFERRED EMBODIMENTS

First of all, one embodiment of the present invention will be described in principle.

Figure 1:
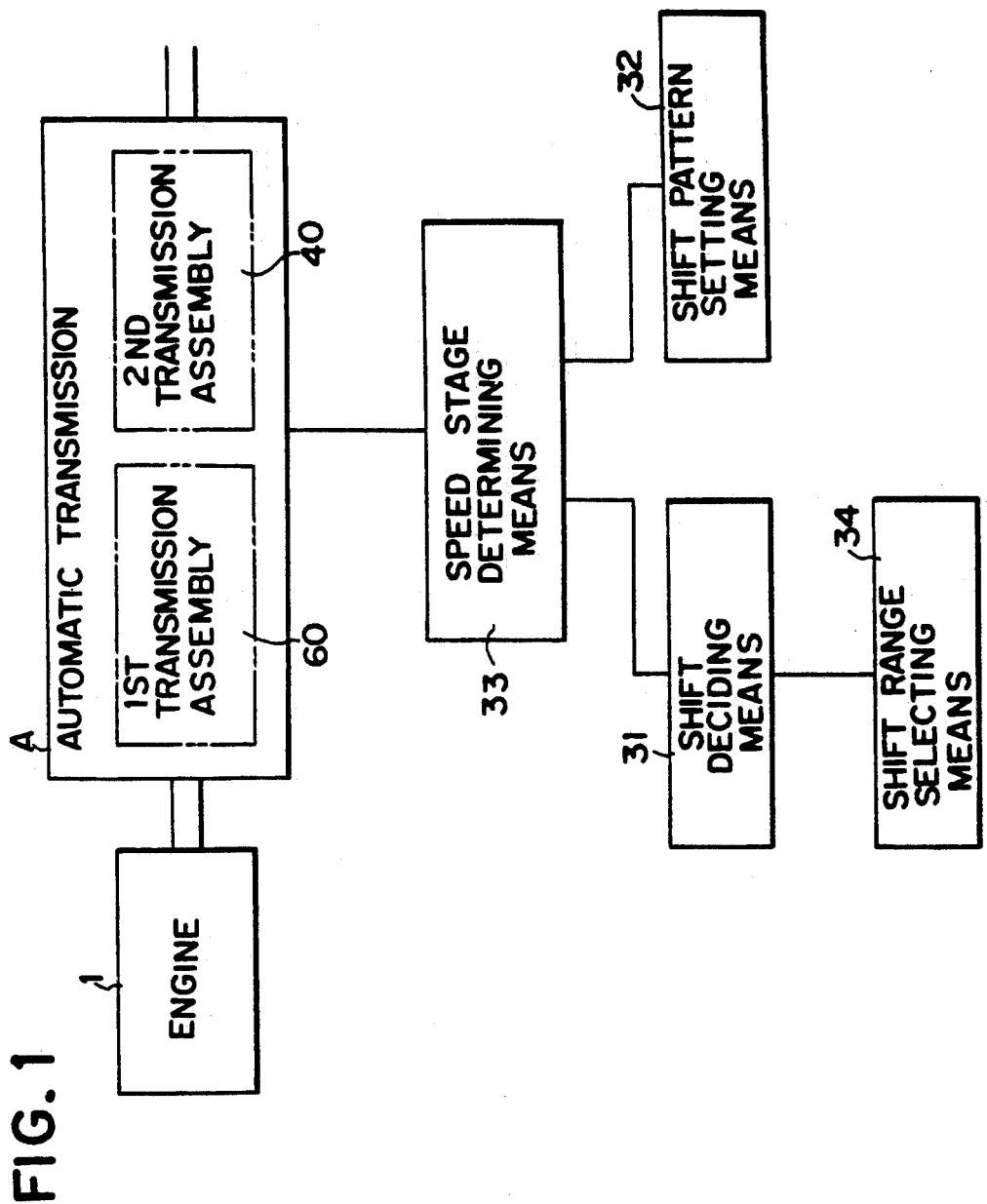
FIG. 1 is a block diagram showing the fundamental components of the present invention.

In FIG. 1, an automatic transmission A is connected to an engine 1 and is equipped with a first transmission assembly 60 and a second transmission assembly 40, which are connected in tandem to each other for effecting shifting operations independently of each other.

A shift control system for controlling the automatic transmission is constructed of shift deciding means 31, shift pattern setting means 32, gear stage determining means 33 and shift range selecting means 34.

The shift deciding means 31 decides the shifts to be executed, on the basis of input data such as a vehicle speed V, a throttle opening $\theta$, and a shift range inputted from the shift range selecting means 34. On the other hand, the shift pattern setting means 32 sets each gear stage with a shift pattern which determines both a shift point for changing the gear stage to be determined according to the data such as the vehicle speed V or the throttle opening $\theta$ and the gear stage. Thus, the shift pattern setting means 32 sets the shift pattern in a manner to avoid the simultaneous shift in which the first transmission assembly 60 and the second transmission assembly 40 are to be simultaneously shifted. On the other hand, the gear stage determining means 33 outputs a shift signal for executing the shift, if decided, according to the set shift pattern. Here, this gear stage determining means 33 outputs the shift signal, till the gear stage is completely switched, so that the shift may be executed according to the shift pattern for the previous gear stage, i.e., the gear stage in operation at the instant the shift is decided. On the other hand, the shift range selecting means 34 is manually actuated to select the ranges of the gear stages to be set, such as an L-range for holding the 1st speed, the 2nd range for inhibiting an upshift to 2nd or higher speeds or the 3rd range for inhibiting an upshift to 3rd or higher speeds. If, therefore, the shift range is switched to the 3rd range while the upshift to the 3rd range is restricted by selecting the 2nd range, the shift deciding means 31 decides the shift from the 2nd speed. At this time, moreover, the gear stage is set at 2nd. As a result, the shift stage determining means 33 outputs the shift signal for executing the shift according to the shift pattern for the 2nd speed.

These operations will be described more specifically in the following.

Figure 2:
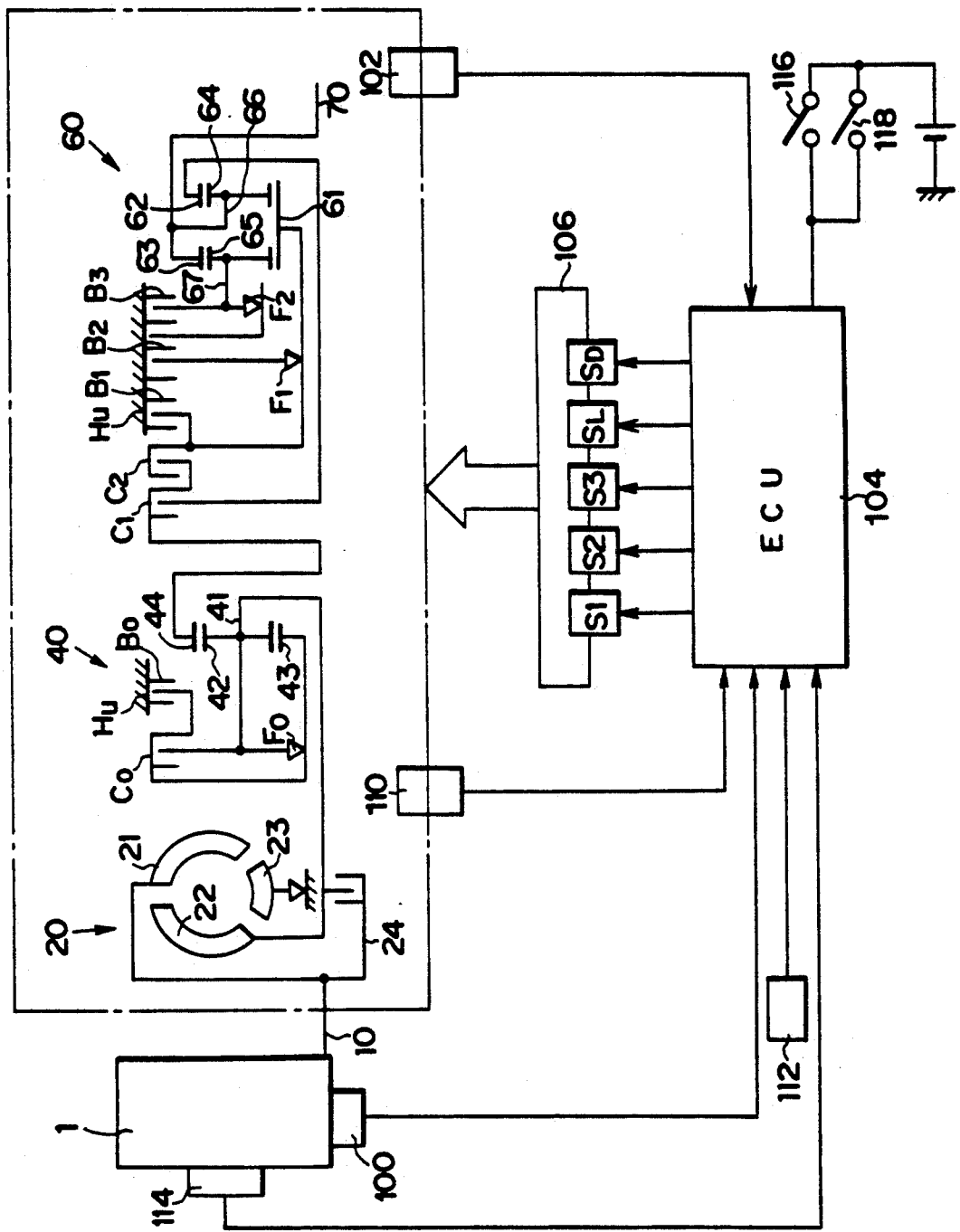
FIG. 2 is a block diagram showing one embodiment of the present invention.

FIG. 2 shows the overall structure of the vehicular automatic transmission, to which the present embodiment is applied.

This automatic transmission is equipped with a torque converter 20 in addition to the second transmission assembly 40 and the first transmission assembly 60 for establishing forward three and reverse one speeds.

The torque converter 20 is composed of a pump 21, a turbine 22, a stator 23 and a lockup clutch 24. The pump 21 is connected to the crankshaft 10 of the engine 1, and the turbine 22 is connected to the carrier 41 of the planetary gear set in the second transmission assembly 40.

In the second transmission assembly 40, a planetary pinion 42 is rotatably supported by the carrier 41 and held in meshing with a sun gear 43 and a ring gear 44. Moreover, a clutch $C_0$ and a one-way clutch $F_0$ are interposed between the sun gear 43 and the carrier 41, and a brake $B_0$ is interposed between the sun gear 43 and a housing Hu.

The first transmission assembly 60 is equipped with two front and rear planetary gear sets. These planetary gear sets are individually composed of a shared sun gear 61, ring gears 62 and 63, planetary pinions 64 and 65, and carriers 66 and 67.

The ring gear 44 of the second transmission assembly 40 is connected through a clutch $C_1$ to the ring gear 62.

On the other hand, a clutch $C_2$ is interposed between the ring gear 44 and the sun gear 61. Moreover, the carrier 66 is connected to the ring gear 63, and these carrier 66 and ring gear 63 are connected together to an output shaft 70. On the other hand, a brake $B_3$ and a one-way clutch $F_2$ are interposed between the carrier 67 and the housing Hu, and a brake $B_2$ is interposed through a one-way clutch $F_1$ between the sun gear 61 and the housing Hu. Moreover, a brake $B_1$ is interposed between the sun gear 61 and the housing Hu.

In the automatic transmission thus constructed, solenoid valves $S_1$ to $S_4$ and $S_L$ in a hydraulic control circuit 106 are driven and controlled in accordance with preset shift patterns by an electronic control unit (ECU) 104 which is fed with the signals of a throttle sensor 100 for detecting the throttle opening reflecting the load state of the engine 1 and a vehicle speed sensor 102 for detecting the vehicle speed. As a result, the combinations of engagement of the individual clutches and brakes, as enumerated at column B in FIG. 3, are made to effect the shift controls.

In FIG. 3, symbols ○ indicate that the corresponding elements are applied, and symbols × indicate that the corresponding elements are engaged only when the engine braking is used.

Figure 4:
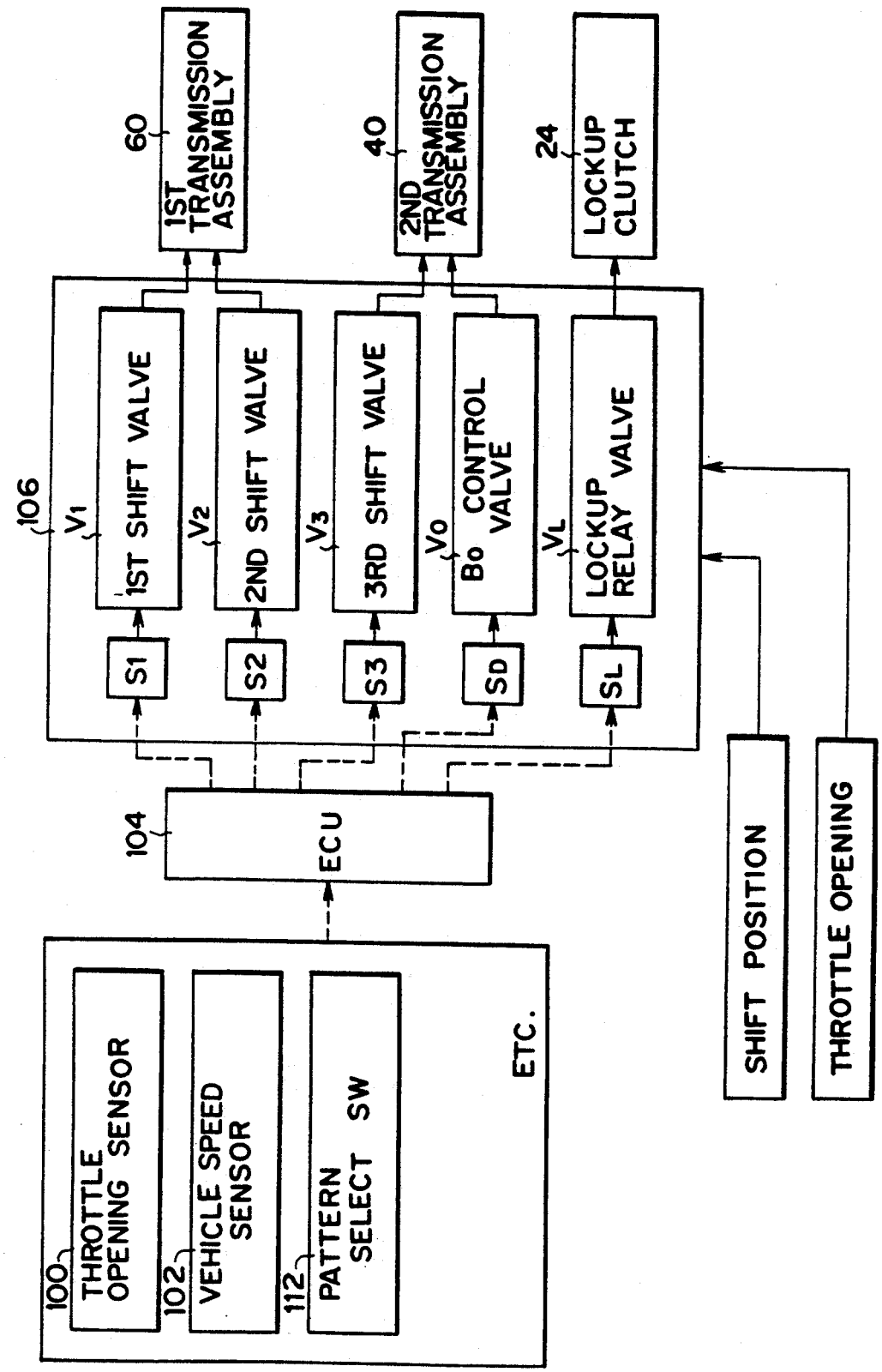
FIG. 4 is a block diagram showing the control flow of hydraulic control means.

As shown in FIG. 4, the solenoid valves $S_1$ and $S_2$ control first and second shift valves $V_1$ and $V_2$ of the first transmission assembly 60. The solenoid valve $S_3$ controls a third shift valve $V_3$ for switching the high- and low-speed sides of the second transmission assembly 40. Moreover, the solenoid valve $S_L$ controls the lockup clutch 24 of the torque converter 20 by way of a lockup relay valve $V_L$. On the other hand, a linear solenoid valve $S_D$ is enabled to control the oil pressures of the brake $B_0$ and so on arbitrarily by way of a $B_0$ control valve $V_0$.

Incidentally, the specific structures and operations of the individual devices themselves in the hydraulic control means are not especially different from those of the prior art.

In FIG 2, reference numeral 110 designates a shift position sensor for detecting the shift ranges to be manually operated by the driver, such as N (neutral), D (drive), R (reverse), 3rd (third), 2nd (second) and L (low) ranges.

Numeral 112 designates a pattern select switch for selecting running patterns such as E (economic run) and P (power run). Numeral 114 designates an overdrive switch for allowing/inhibiting an overdrive run manually. Numeral 116 designates a foot brake switch. Numeral 118 designates a brake switch for detecting the operation of a side brake.

Figure 5:
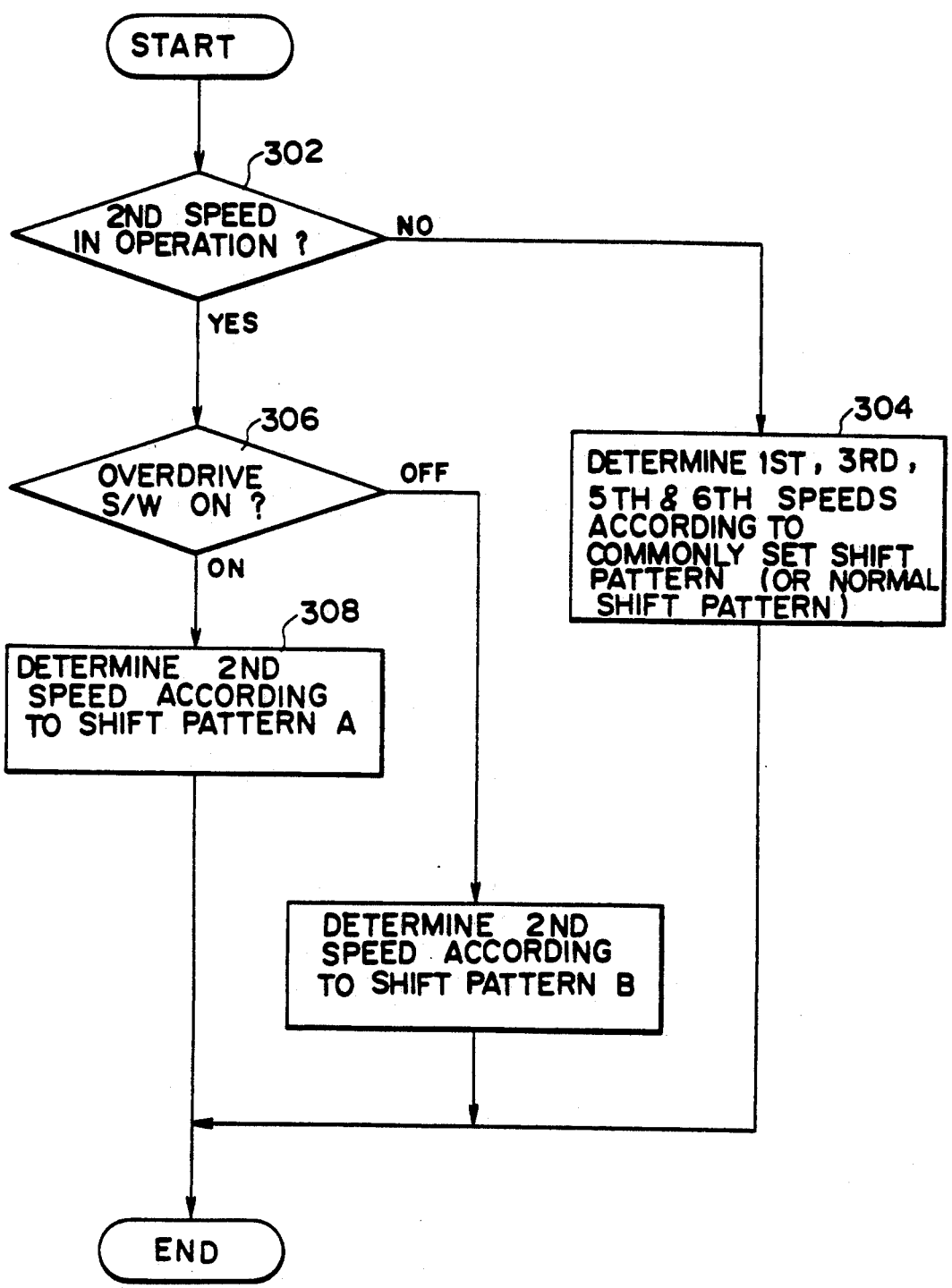
FIG. 5 is a flow chart for explaining a control routine.

FIG. 5 shows a control routine to be executed by the aforementioned system of the present embodiment.

Figure 6:
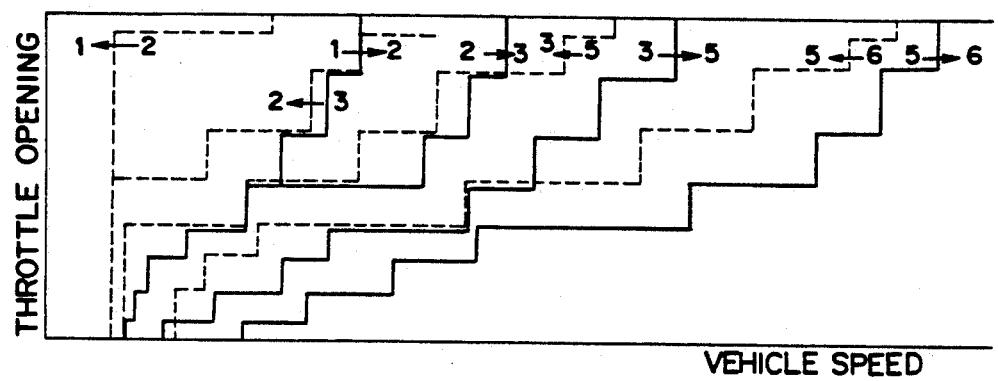
FIG. 6 is a diagram showing shift patterns to be set for the gear stages other than the 2nd speed.

First of all, it is decided at Step 302 whether or not the gear stage in operation is at the 2nd speed. This decision of the 2nd speed is made not only when the automobile is actually running at the 2nd speed but also when a shift from the 2nd speed to another is not completely ended but being in its course. If it is decided at Step 302 that the gear stage in operation is not at the 2nd speed, the routine advances to Step 304, at which the gear stage is determined according to a shift pattern (or normal shift pattern) which is commonly set for the 1st, 3rd, 5th and 6th speeds. This normal shift pattern is exemplified in FIG. 6.

In the present embodiment, more specifically, the gear stage intrinsic (unique) to the 2nd speed is separately set, and one kind of (or common) normal shift pattern is set for the remaining gear stages (i.e., the 1st, 3rd, 5th and 6th speeds). Thus, the gear stage is set according to that normal shift pattern if it is other than the 2nd speed.

Incidentally, here is omitted the 4th speed. This is because the 4th speed is cut from the normal shift pattern itself. This 4th speed is also cut in the shift pattern which is set intrinsic to the 2nd speed, as will be described hereinafter. In this automatic transmission, therefore, only the five gear stages at most are practically used because the 4th speed is left unselected no matter what the gear stage in operation might be, although the number of gear stages achievable is "6".

If it is decided at Step 302 that the speed stage in operation is at the 2nd speed, the routine advances to Step 306, at which it is decided whether the overdrive switch 114 is ON or OFF. If ON, i.e., if the shift to the 6th speed is allowed by the driver, the routine advances to Step 308, at which the gear stage is determined according to one shift pattern A of the two shift patterns intrinsic to the 2nd speed. This shift pattern A is exemplified in FIG. 7(A). If, on the contrary, the overdrive switch 114 is OFF, the gear stage is determined according to the other shift pattern B of the two shift patterns intrinsic to the 2nd speed. This shift pattern B is exemplified in FIG. 7(B).

Thus, the present embodiment is characterized in that the two shift patterns A and B are provided intrinsic to the 2nd speed.

Figure 7:
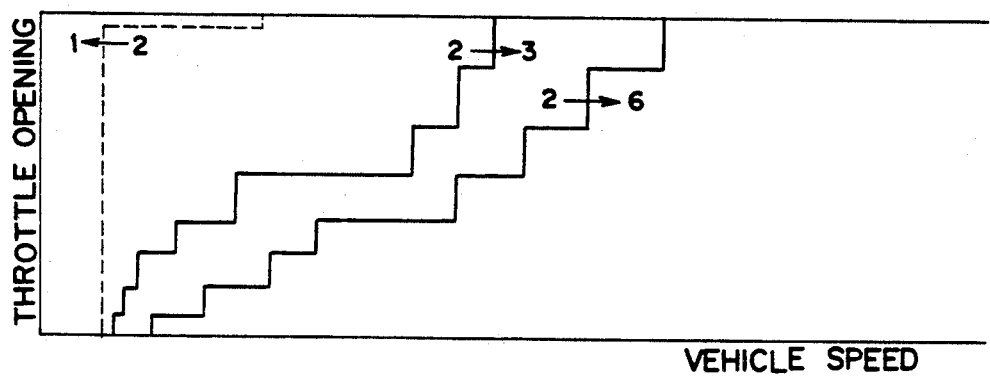
FIGS. 7(A) and 7(B) are diagrams individually showing shift patterns to be set for the 2nd speed.
Figure 7:
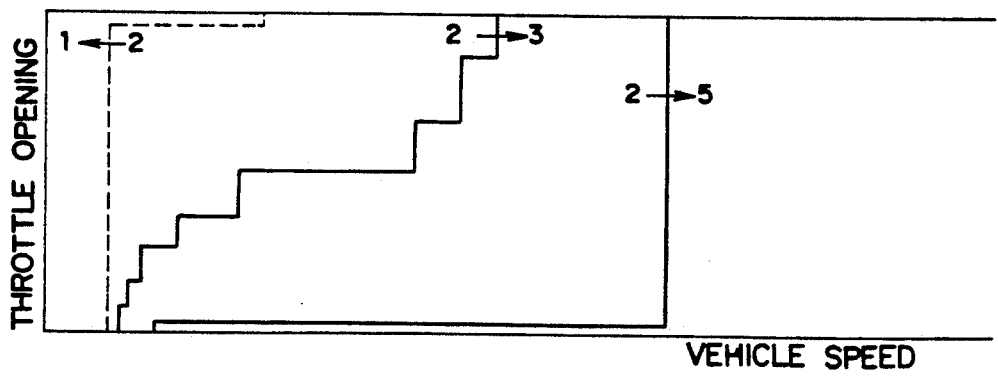

In the shift pattern A to be selected when the overdrive switch 114 is ON, as shown in FIG. 7(A), the upshift line to the 5th speed is changed into the upshift line to the 6th speed.

As a result, the jumping shift to the 5th speed is not established when the gear stage in operation is at the 2nd speed. The jumping shift from the 2nd speed to the 5th speed is seriously difficult to control, because the first transmission assembly 60 is jumped in a high-gear shift from the 1st speed to the 3rd speed whereas the second transmission assembly 40 is jumped in a low-gear shift from the high speed to the low speed. Thus, the omission of this shift is preferable from the standpoint of reducing the shift shocks.

On the other hand, the shift pattern B to be selected when the gear stage in operation is at the 2nd speed and when the overdrive switch 114 is OFF is caused to take the following points into consideration. With reference to the shift pattern B, the shift to the 6th speed is not established, but the jumping shift to the 5th speed is executed for most of the regions when the throttle opening is wholly closed and when an idle contact switch (although not shown) is ON.

This reasoning will be described in the following. When the throttle opening is fully closed, it is desirable that the engine braking be well effective. In this automatic transmission, however, the gear stages for effecting the engine braking in the drive range are limited to the 5th and 6th speeds from the structure of the gear train. Of these, the 6th speed cannot be used because the overdrive switch 114 is OFF. Therefore, only when the throttle opening is fully closed, the jumping shift to the 5th speed is permitted even while allowing a slight augmentation of the shift shocks, so that the engine braking may be effected.

Since the upshift point to the 6th speed is set at a considerably lower level according to the shift pattern A than that according to the normal shift pattern, the region for the simultaneous shift to the 3rd speed is narrowed, and the region for the jumping shift to the 6th speed is accordingly widened. The jumping shift from the 2nd speed to the 6th speed is subjected to relatively small shift shocks because it can be achieved by the shift of the first transmission assembly 60 only. Moreover, an improvement in the fuel consumption can be expected because of an increase in the run at the 6th speed.

Incidentally, the present embodiment can be applied not only to the shifts in the drive range but also naturally to the case in which an automatic switching of the gear stages is executed in the 2nd range, for example. Especially when the shift range is the 2nd range, the shifts from the run at the 2nd speed are necessarily increased. Therefore, the change of the shift patterns when the gear stage in operation is at the 1st or 3rd speed or at the 2nd speed effectively functions to reduce the shift shocks.

In the embodiment thus far described, the normal shift pattern is set for the 1st, 3rd, 5th and 6th speeds. According to the present invention, however, different shift patterns can be set at the individual gear stages.

This embodiment is shown in FIGS. 8(A) to 8(E), in which only the upshift lines are presented to simplify the description.

Figure 8:
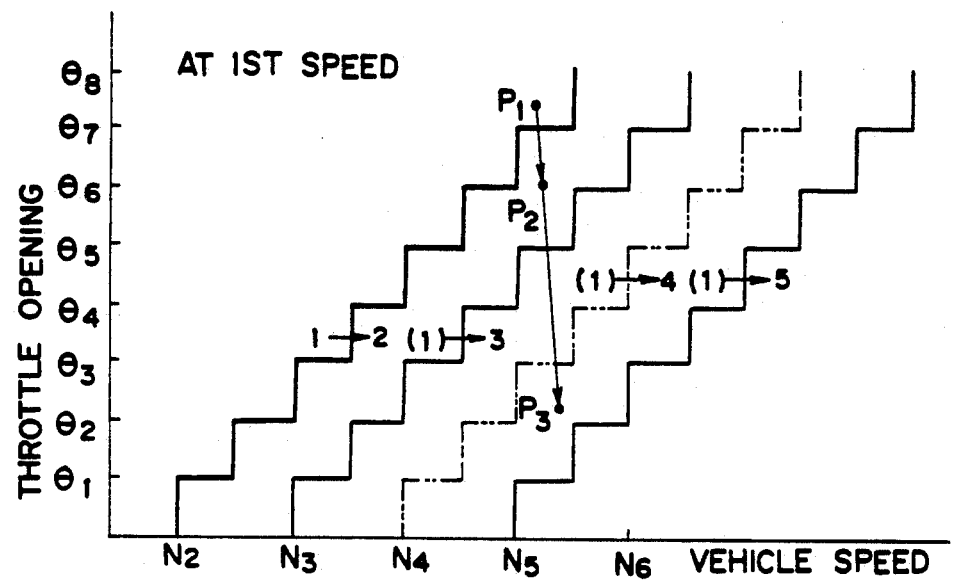
FIGS. 8(A) to 8(E) are diagrams individually showing shift patterns to be set for the 1st to 5th speeds.
Figure 8:
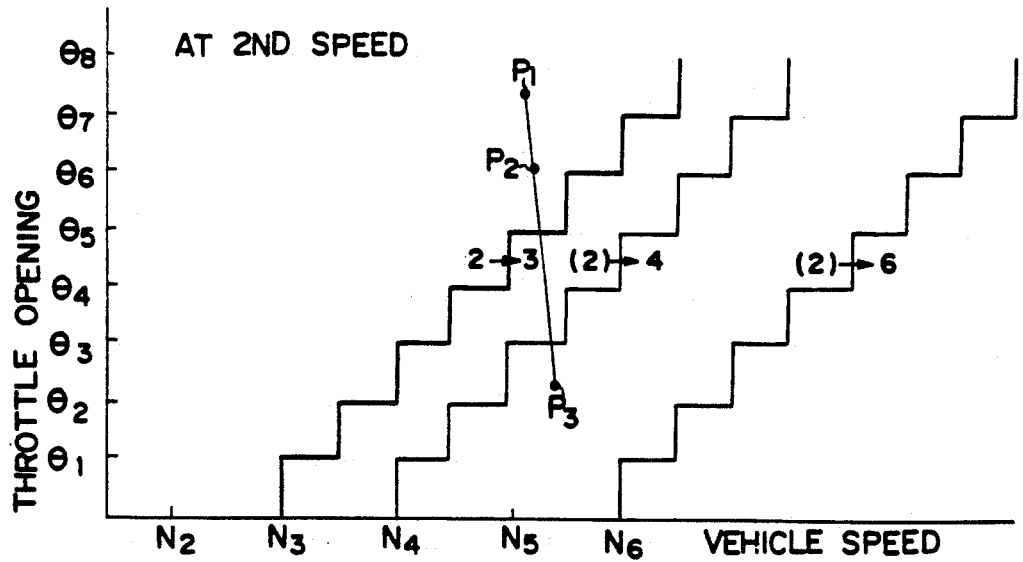
Figure 8C:
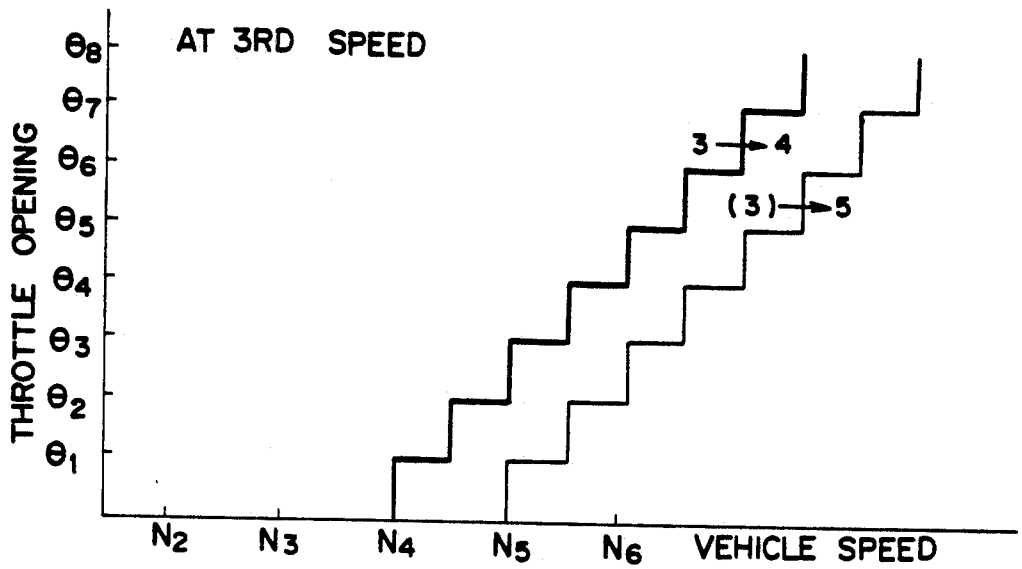
Figure 8D:
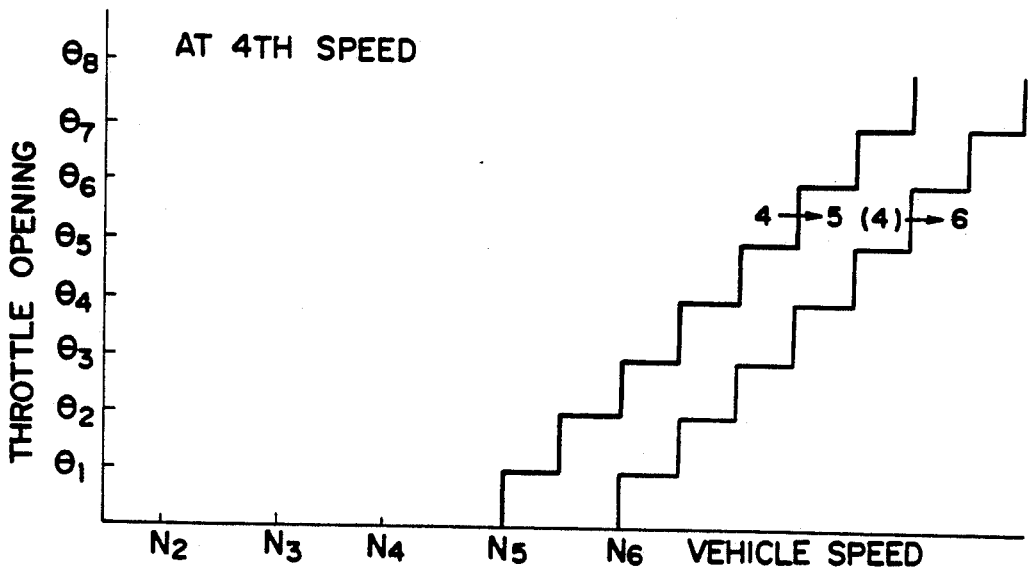
Figure 8E:
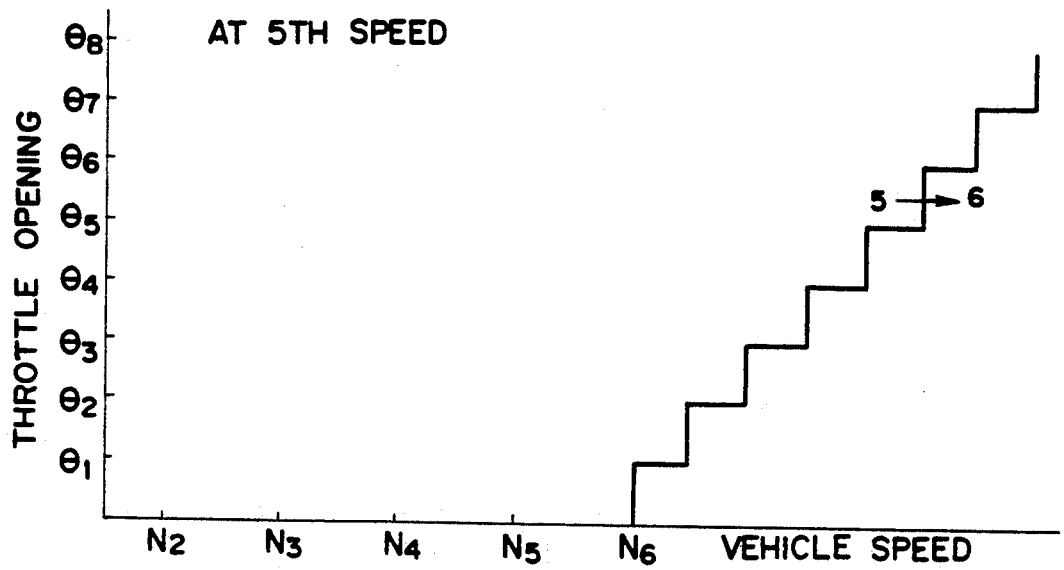

FIG. 8(A) shows an intrinsic shift pattern which is set when the gear stage in operation is at the 1st speed. Likewise, FIGS. 8(B) to 8(E) show intrinsic shift patterns which are individually set when the gear stage is at one of the 2nd to 5th speeds.

In the present embodiment, it is deemed that the gear stage in operation is continued till the shift from this gear stage to another is completely ended. The shift is executed on the basis of the intrinsic shift pattern which is set for each of the deemed shift stages in operation.

Let it be assumed that the automatic transmission is not in the state of the 1st speed. What is selected at this 1st speed is the shift pattern shown in FIG. 8(A). It is further assumed here that the accelerator is slightly loosened from point $P_1$ to point $P_2$. In this case, the automatic transmission crosses the shift line of 1→2 so that the upshift to the 2nd speed is realized.

In case, moreover, the accelerator is considerably returned to point $P_3$, the automatic transmission crosses the shift line to the 3rd speed so that it is jumped to the 3rd speed.

Since this shift pattern (i.e., the shift map of FIG. 8(A)) intrinsic to the 1st speed has none of the jumping shift line from the 1st speed to the 4th speed, the automatic transmission is not jumped from the 1st speed to the 4th speed. This is because the jumping shift from the 1st speed to the 4th speed has to be followed by the simultaneous shifts of the first transmission assembly 60 and the second transmission assembly 40 so that the shift shocks may possibly be increased. Generally speaking, in case of an upshift to be caused by loosening the accelerator (as will be called the "power-OFF upshift"), there arises no serious problem even if the shift destination itself is different by one (or two) step. Therefore, it is not necessary in the least to execute such high-grade shifts even with the shift shocks being caused by executing the difficult shifts.

This shift pattern intrinsic to the 1st speed is adopted till the shift from the 1st speed to another is completely ended. This adoption is one of major features of the present invention. Even if the accelerator is slightly loosened from the state of $P_1$ to the state of $P_2$ and then further loosened to the state of $P_3$ while the automatic transmission is executing the shift to the 2nd speed, the automatic transmission is shifted up to the 3rd speed so long as the shift is executed according to that shift pattern intrinsic to the 1st speed. As a result, the jumping shift from the 1st to 4th speeds with the large shift shocks cannot be executed in the least.

In case, on the contrary, a short time is elapsed in the shifted state from $P_1$ to $P_2$ so that the shift from the 1st to 2nd speeds is completely ended, the gear stage in operation is switched at that instant. From now on, the intrinsic shift pattern set in advance for the 2nd speed, i.e., the shift pattern of FIG. 8(B) is used.

As is apparent from FIG. 8(B), the shift pattern to be used when the gear stage in operation is at the 2nd speed contains the shift line to the 4th speed. As a result, in case the accelerator is further released till the instant $P_3$ if the shift to the 2nd speed is completely ended at the instant $P_2$, what is executed is the jumping shift from the 2nd to 4th speeds.

Since this jumping shift from the 2nd to 4th speeds can be achieved merely by shifting the first transmission assembly 60 from the 1st speed to the 2nd speed (but not the second transmission assembly 40), as is apparent from FIG. 3, it can be achieved with the very small shift shocks. Thus, even the execution of this shift raises no serious problem.

At the 2nd speed, on the other hand, the shift to the 5th speed becomes seriously difficult to execute. Therefore, this shift to the 5th speed is inhibited although it has been allowed when the gear stage in operation is at the 1st speed.

Figure 9:
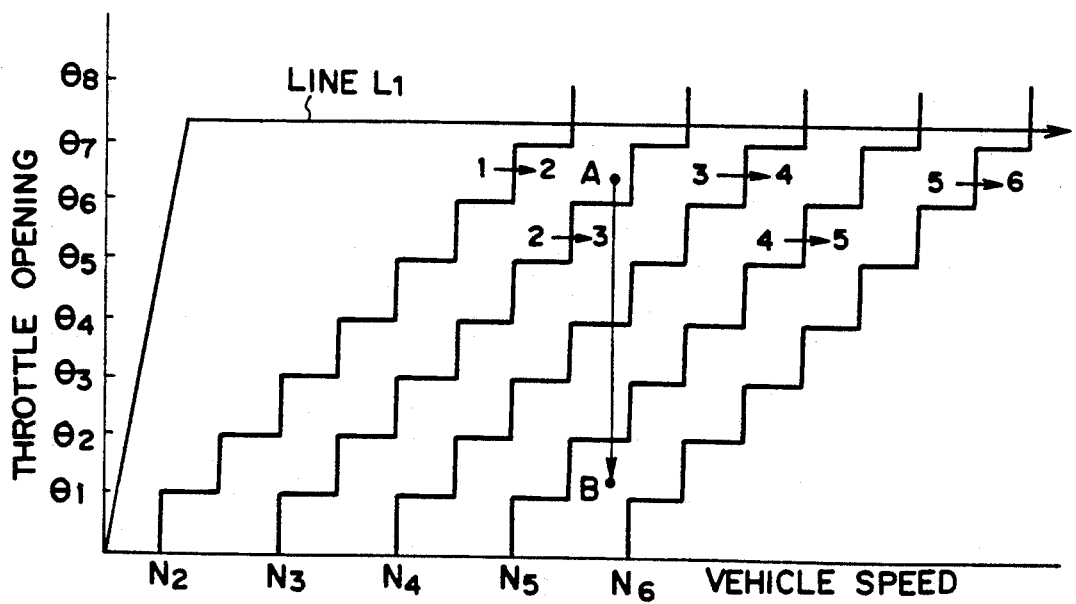
FIG. 9 is a diagram showing ordinary shift patterns to be set by the automatic transmission having forward six gear stages.

Incidentally, each of the shift patterns of FIGS. 8(A) to 8(E) is always prepared with the shift line for an upshift of only one stage from the gear stage in operation, as indicated by a thick solid line. As a result, all the gear stages from the 1st to 6th speeds can be sequentially used in case the vehicle speed is raised with the accelerator being depressed (as indicated by line $L_1$ in FIG. 9). Thus, it is possible to enjoy the advantage of achieving the increased number of gear stages.

The present invention has been described in connection with the shift lines for the upshifts but can likewise be applied to the shift lines for downshifts. As a result, the shifts difficult to control can be selectively omitted so that the busy shifts can be suppressed to an extent corresponding to the omission. At the same time, all the gear stages to be achieved can be used, if necessary, so that the disadvantage of the multistage shifts can be coped with while their advantage being enjoyed.

Incidentally, the present invention will not exert restrictions upon the purpose and the shift pattern of each gear stage. Specifically, the foregoing embodiment has considered the omission of such jumping shifts as are difficult to control. In order to perform the busy shift prevention thoroughly, for example, the jumping shift could be positively suppressed although it is not especially difficult to control. It is also possible to select a shift pattern, in which the shift stage for the engine braking becomes predominant when the throttle opening is fully closed. It is further possible to expand or constrict the region, in which a predetermined gear stage is selected by changing the position of the shift line, even if the kind of the gear stage to be achieved is identical.

Incidentally, the situation for a shift is established not only when the vehicle speed or the throttle opening changes but also when the shift range is manually changed, with the following problems.

Generally speaking, a gear stage in operation is held even if the vehicle speed rises, in the hold range or in the range for a shift to an upper state to be inhibited. In case the shift range is manually switched from such hold range or upshift inhibiting range, the shift may be executed at a relatively low vehicle speed, or a shift of the same kind is executed at a relatively high vehicle speed. In case the shift is thus executed over a wide range of vehicle speed or engine load, the satisfactory shift characteristics are seriously difficult to maintain for either the wide range because this maintenance depends upon the durability of the frictional engagement means. In case of a shift to be caused according to the manual switching, the situation is that the control is made seriously difficult because of large variations of the vehicle speed and the throttle opening.

In case, on the contrary, the simultaneous shifts are caused in the drive range or the like by the automatic shift, the controls are relatively easy because the dispersions of the vehicle speed and the engine load at that time are not so large.

Noting this point, therefore, the present invention changes the shift pattern in advance so as to prevent the simultaneous shift by detecting whether or not the simultaneous shifts are liable to occur in accordance with the manual switching. Because of the change in the shift pattern, the simultaneous shifts are not merely inhibited, but the shift is switched to another near gear stage (i.e., not the simultaneous shifts). As a result, the improvement in the power performance and the reduction in the shift shocks are made compatible.

Incidentally, the "change in the shift pattern" in the present invention shall naturally contain the technology of the substantial "change of the shift pattern" either by changing the kind of the shift obtained into another without changing the shift line of the basic vehicle speed and the throttle opening or by correcting the value of the vehicle speed signal inputted.

Figure 10:
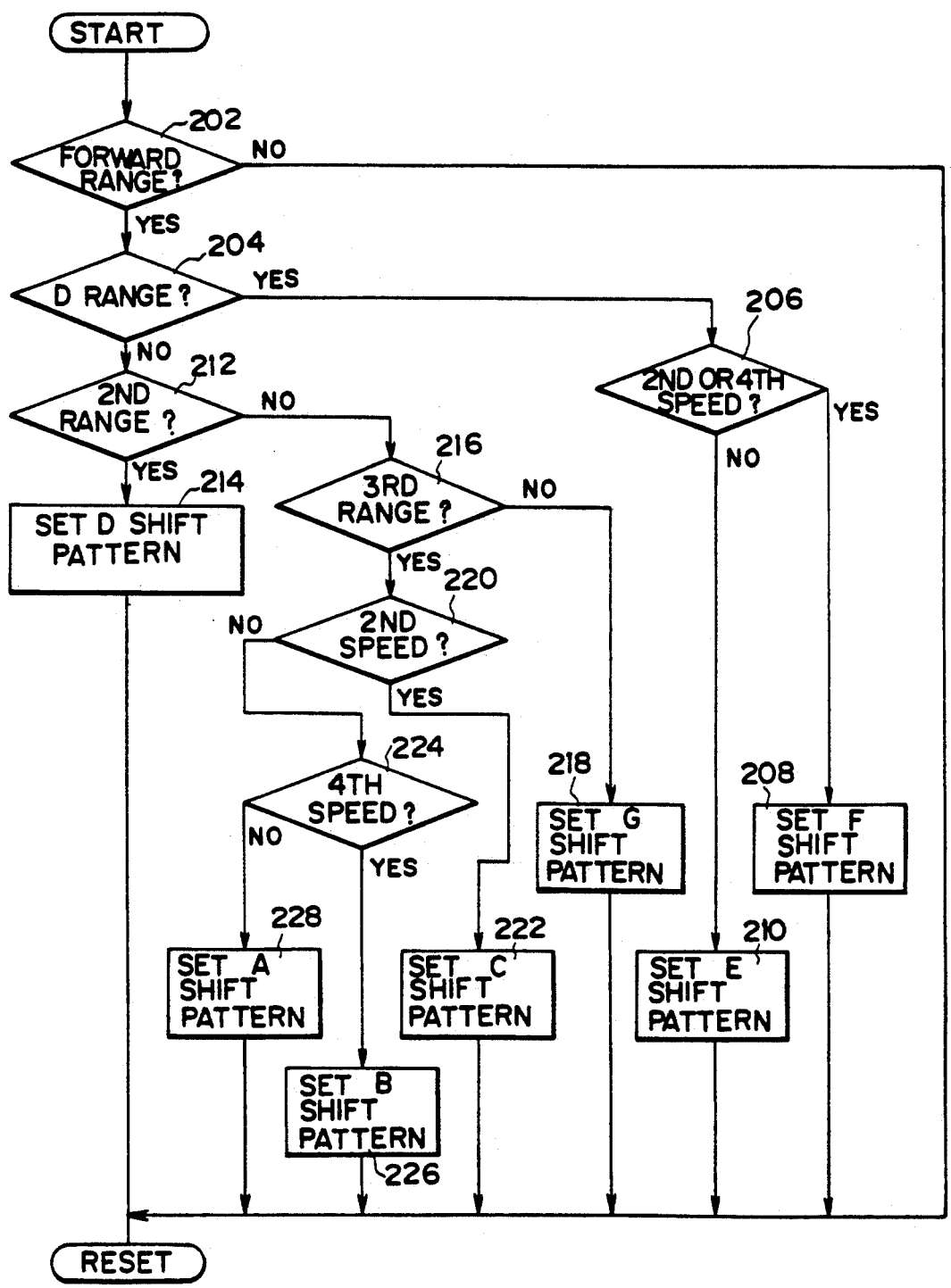
FIG. 10 is a flow chart for explaining another control routine.

The automatic transmission shown in FIG. 2 can also execute the change in the shift pattern following the aforementioned change in the shift pattern, as will be described in connection with the control procedures with reference to the flow chart of FIG. 10.

First of all, it is decided at Step 202 whether or not the shift range belongs to a forward range (e.g., the D, 3rd, 2nd or L range). If NOT, the routine is reset as it is, and the corresponding control flow is not executed on purpose.

If YES, the routine advances to Step 204, at which it is decided whether or not the shift range is the D range. If in the D range, the routine advances to Step 206, at which it is decided whether or not the gear stage in operation is the 2nd speed or the 4th speed.

Here, the decision of the operated gear stage is made, if for the 2nd speed, till the gear stage is completely ended even while the shift from the 2nd speed to another being executed.

Figure 11:
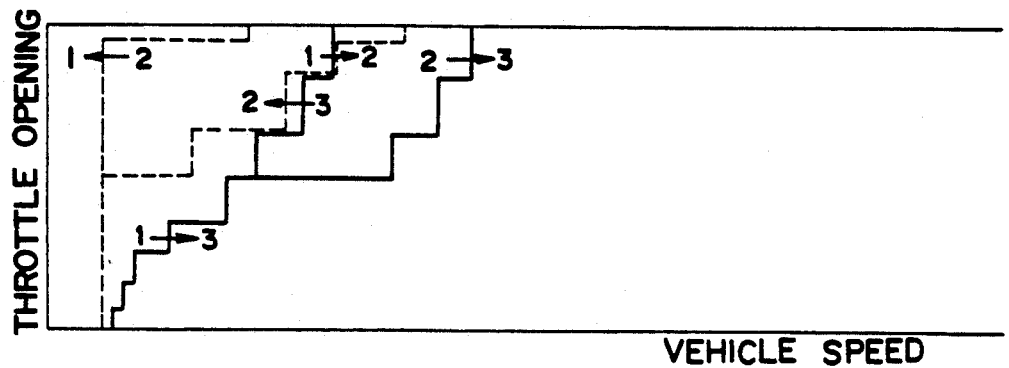
FIGS. 11(A) to 11(G) are diagrams individually showing shift patterns to be used in the control routine of FIG. 10.
Figure 11:
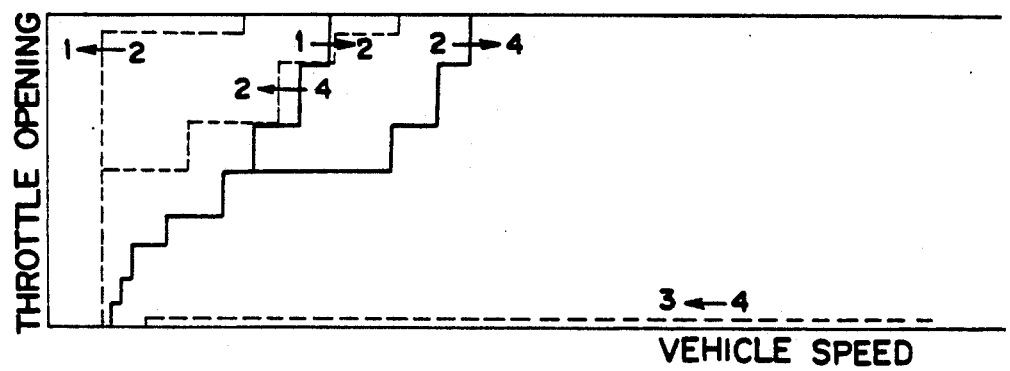
Figure 11:
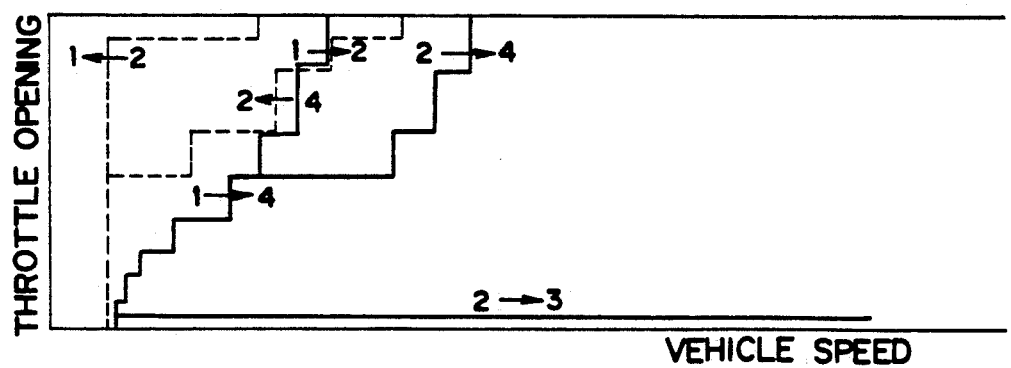
Figure 11:
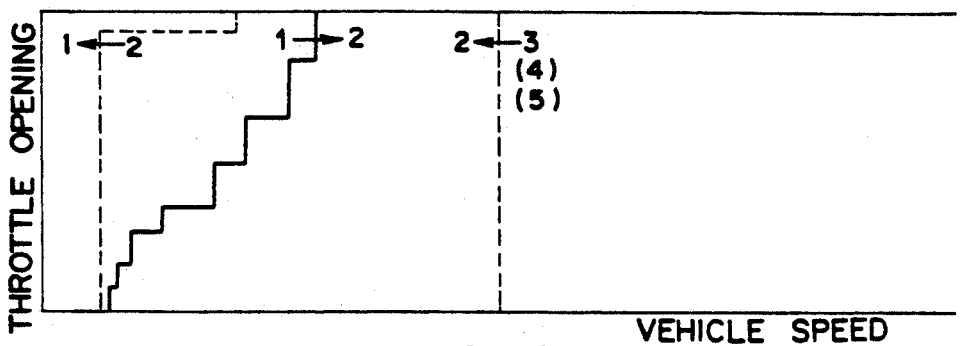
Figure 11:
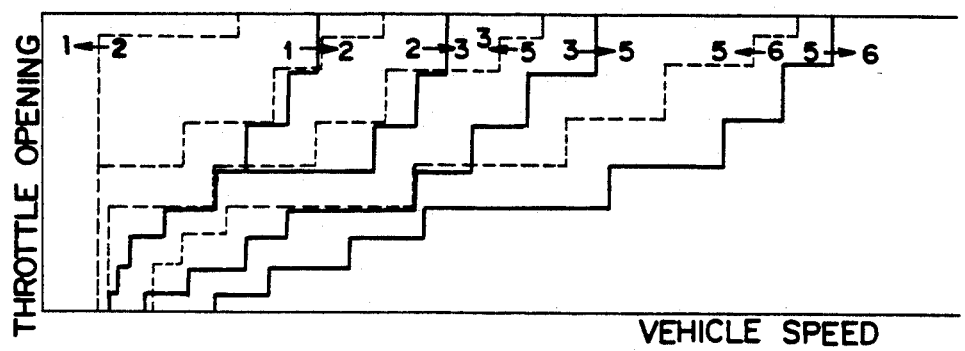
Figure 11:
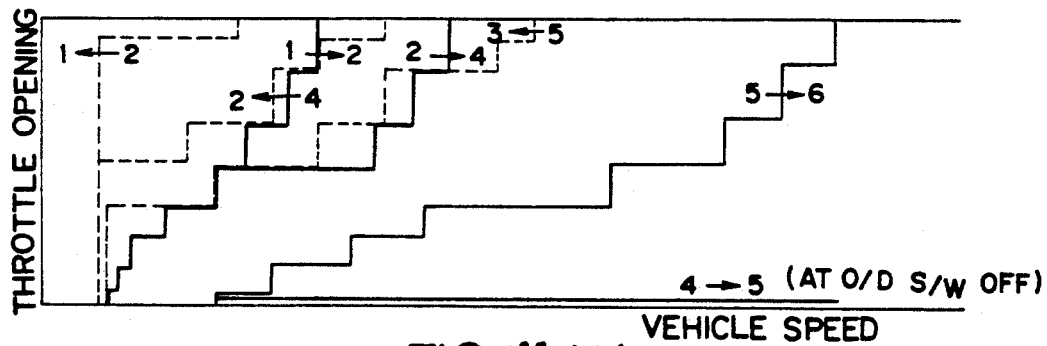
Figure 11:
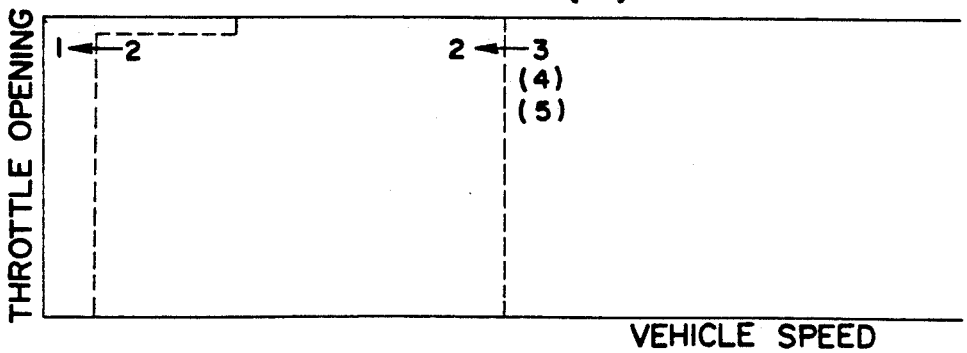

If it is decided at Step 206 that the gear stage in operation is the 2nd or 4th speed, the routine advances to Step 208, at which the shift pattern shown in FIG. 11(F) is set.

If it is decided that the shift range is the D range but that the gear stage in operation is neither the 2nd nor 4th speed, the routine advances to Step 210, at which the shift pattern shown in FIG. 11(E) is set.

If, on the contrary, it is decided at Step 204 that the shift range is not the D range, the routine advances to Step 212, at which it is decided whether or not the shift range is the 2nd range. If YES, the shift pattern shown in FIG. 11(D) is set.

Otherwise, the routine advances to Step 216, at which it is decided whether or not the shift range is the 3rd range. If NO, the shift range is the L range, and the routine advances to Step 218, at which the shift pattern shown in FIG. 11(G) is set.

If it is decided at Step 216 that the shift range is the 3rd range, it is decided at Step 220 whether or not the gear stage in operation is the 2nd speed. If, in this case, the 2nd speed prevails in the 2nd range, the gear stage in operation is decided to be the 2nd speed immediately after the shift range has been manually shifted to the 3rd range.

If the operated gear stage is the 2nd speed, the routine advances to Step 222, at which the shift pattern shown in FIG. 11(C) is set.

According to this shift pattern shown in FIG. 11(C), the shift from the 2nd speed to the 4th speed is caused in place of that from the 2nd speed to the 3rd speed when the idle contact is OFF, and the shift from the 2nd speed to the 3rd speed is caused when the idle contact is ON.

If it is decided at Step 220 that the operated gear stage is not the 2nd speed, the routine advances to Step 224, at which it is decided whether or not the same is the 4th speed. If YES, the routine advances to Step 226, at which the shift pattern shown in FIG. 11(B) is set. According to this shift pattern, a downshift from the 4th speed to the 3rd speed is caused with the idle contact being OFF.

If the operated gear stage is not the 4th speed, the routine advances to Step 228, at which the shift pattern for the ordinary 3rd range, as shown in FIG. 11(A), is set.

Thus, the following operational effects can be attained by the shift patterns set by this control process and the individual steps.

First of all, in case of the manual shift from the 2nd speed of the 2nd range to the 3rd range, the control process is advanced in the course of Steps 206→220→222 according to the definition of the operated gear stage so that the shift pattern of FIG. 11(C) is selected. As a result, the shift from the 2nd speed to not the 3rd speed but the 4th speed is executed if the power is transmitted from the engine to the wheels (as in the power-ON state). If, on the contrary, the so-called "engine braking" prevails so that the power is transmitted from the wheels to the engine (as in the power-OFF state), the shift from the 2nd speed to the 3rd speed is executed.

If the operated gear stage is the 4th speed, on the other hand, the control process is advanced in the course of Steps 216→220→224→226 so that the shift from the 4th speed to the 2nd speed is caused when the throttle opening is fully closed (for the idle contact ON). If the operated gear stage is other than the 2nd and 4th speeds, on the contrary, the control process is advanced in the course of Steps 216→220→224→228 so that the ordinary shift pattern for the 3rd range is set.

As a result, it is possible to avoid the shift from the 2nd speed to the 3rd speed in the most uncontrollable power-ON state when the shift is manually accomplished from the 2nd range to the 3rd range.

At the time of a shift from the 2nd range to the D range, on the other hand, the control process advances in the course of Steps 206→208, if at the 2nd speed, and in the course of Steps 206→210 if at another speed. As a result, the simultaneous shifts are avoided from the 2nd to 3rd speeds and from the 2nd to 5th speeds. Incidentally, the shift line of the 4th speed→ the 5th speed of the shift pattern of FIG. 11(F) is set only when the overdrive switch is OFF. The reasoning for this setting will be described in the following. When the overdrive switch is OFF, the shift from the 5th to 6th speeds is inhibited. If the shift is then allowed up to the 4th speed only, the engine braking is made ineffective by the structure of the gear train shown in FIG. 2. This disadvantage can be obviated by setting the shift line from the 4th to 5th speeds for the overdrive switch OFF.

As has been described hereinbefore, according to the present invention, the simultaneous shift of the first transmission assembly and the second transmission assembly can be avoided by setting the shift patterns properly for the individual gear stages. As a result, the shift shocks can be reduced while facilitating the controls for the shifts. Moreover, the power performance can be improved.

What is claimed is:

1. A shift control system for controlling the shifts of a vehicular automatic transmission connected to an engine and comprising first and second transmission assemblies capable of executing the shifts independently of each other and connected in tandem to each other to provide a set of gear stages, comprising:

shift deciding means for deciding that a shift from a currently set gear stage to an other gear stage is to be executed, on the basis of input data;

a plurality of shift patterns, at least one of said shift patterns being unique to one gear stage of said set of gear stages;

shift pattern setting means, including currently set gear stage detecting means, for selecting and setting a shift pattern from amongst a plurality of shift patterns, the selected shift pattern being unique to at least for the currently set gear stage, but fewer than said set of gear stages, said unique shift pattern determining a shift point and the other gear stage for restricting a simultaneous shift of said first and second transmission assemblies; and gear stage determining means for outputting a shift signal so that the shifts are executed according to the set shift pattern.

2. A shift control system according to claim 1, wherein said shift pattern setting means comprises means to preset a shift pattern unique to each of said gear stages.

3. A shift control system according to claim 1, further comprising detection means for detecting that a shift from the currently set gear stage to another has been completed,
    wherein said gear stage determining means comprises means to output a shift signal for performing the shift in accordance with the selected unique shift pattern for the currently set gear stage until said detection means detects the completion of the shift.

4. A shift control system according to claim 1, further comprising shift range selecting means for changing a shift range by a manual operation and inputting the shift range as one of said input data to said shift deciding means.

5. A shift control system according to claim 4, wherein said shift pattern setting means comprises means to set the shift pattern determining the shift point and the gear stage in a manner to avoid the simultaneous shift when power is inputted from said engine to said automatic transmission.

6. A shift control system according to claim 1, wherein said shift pattern setting means comprises means to set the shift pattern avoiding the simultaneous shift, only when the throttle opening is equal to or higher than a predetermined value, the shift pattern for performing the simultaneous shift and the gear stage having an effective engine braking, when the throttle opening is less than another predetermined value.

7. A shift control system according to claim 1, wherein said first transmission assembly is constructed to execute at least three gear stages, and wherein said second transmission assembly is constructed to execute two gear stages.

8. A shift control system according to claim 1, wherein said automatic transmission is constructed to set a predetermined gear stage by an upshift of said first transmission assembly and a downshift of said second transmission assembly and to set another predetermined gear stage by the downshift of said first transmission assembly and the upshift of said second transmission assembly.

9. A shift control method of controlling the shifts of a vehicular automatic transmission connected to an engine and comprising first and second transmission assemblies capable of executing a shift from a currently selected gear stage independently of each other and connected in tandem to each other to provide a set of gear stages, including the steps of:

detecting a currently set gear stage;

storing a plurality of shift patterns, at least one of said shift patterns being unique to one gear stage of said set of gear stages;

selecting and setting a shift pattern from amongst a plurality of shift patterns, the selected shift pattern being unique to the currently set gear stage for determining a shift point and a gear stage to be set, the unique shift pattern restricting simultaneous shifting of said first and second transmission assemblies, and executing the shifts according to the set shift pattern.

10. A shift control method according to claim 9, including a shift pattern unique to each gear stage.

11. A shift control method according to claim 9, including:

detecting the completion of the currently set gear stage in operation to another, and executing the shift according to the unique shift pattern set for the currently set gear stage until a completion of the shift is detected.

12. A shift control method according to claim 9, wherein said input data includes the change of a shift range by manual operation.

13. A shift control method according to claim 9, wherein the shift pattern setting the shift point and the gear stage in a manner to avoid the simultaneous shift is set when power is inputted from said engine to said automatic transmission.

* * * * *